United States Patent Office
3,306,675
Patented Feb. 28, 1967

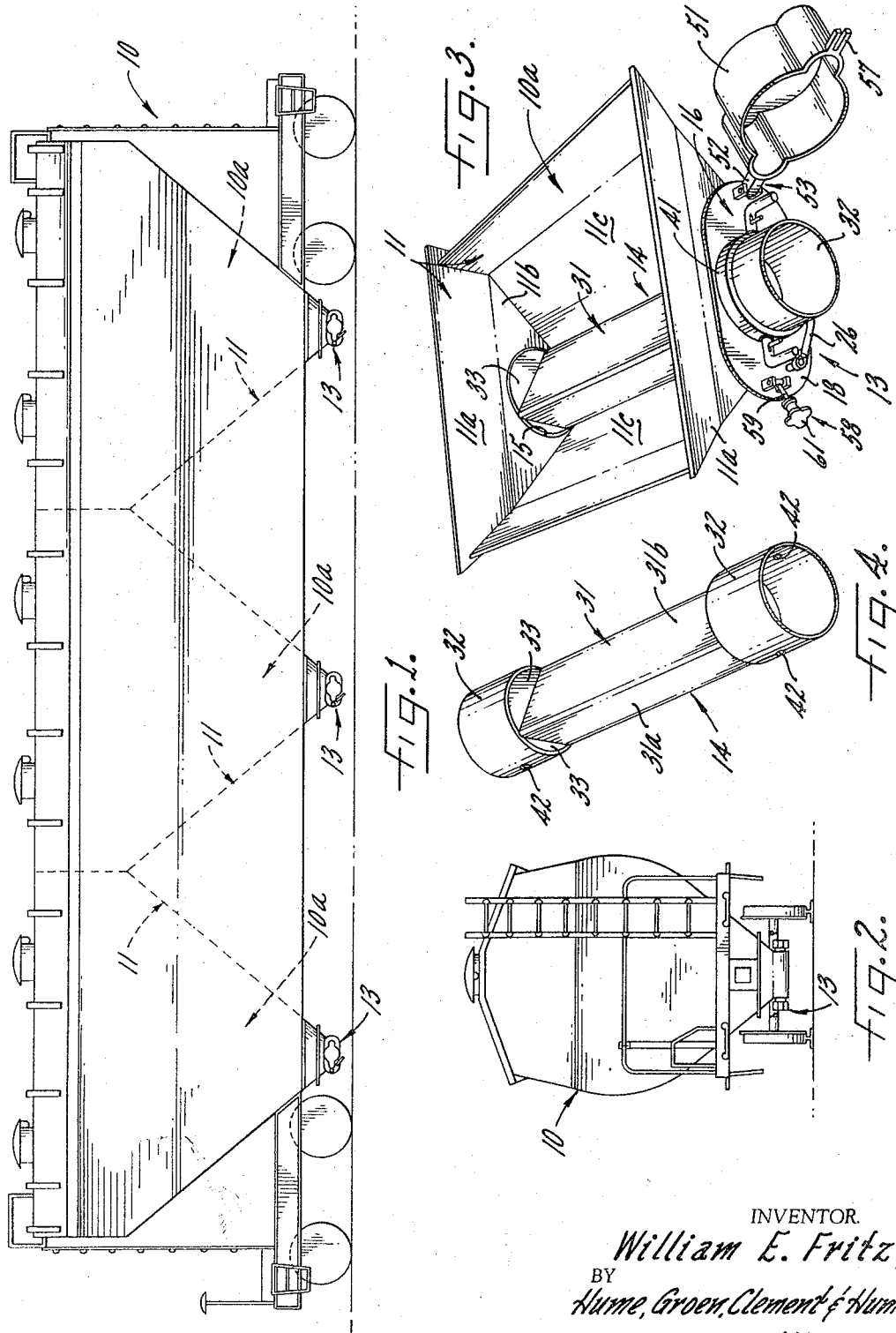

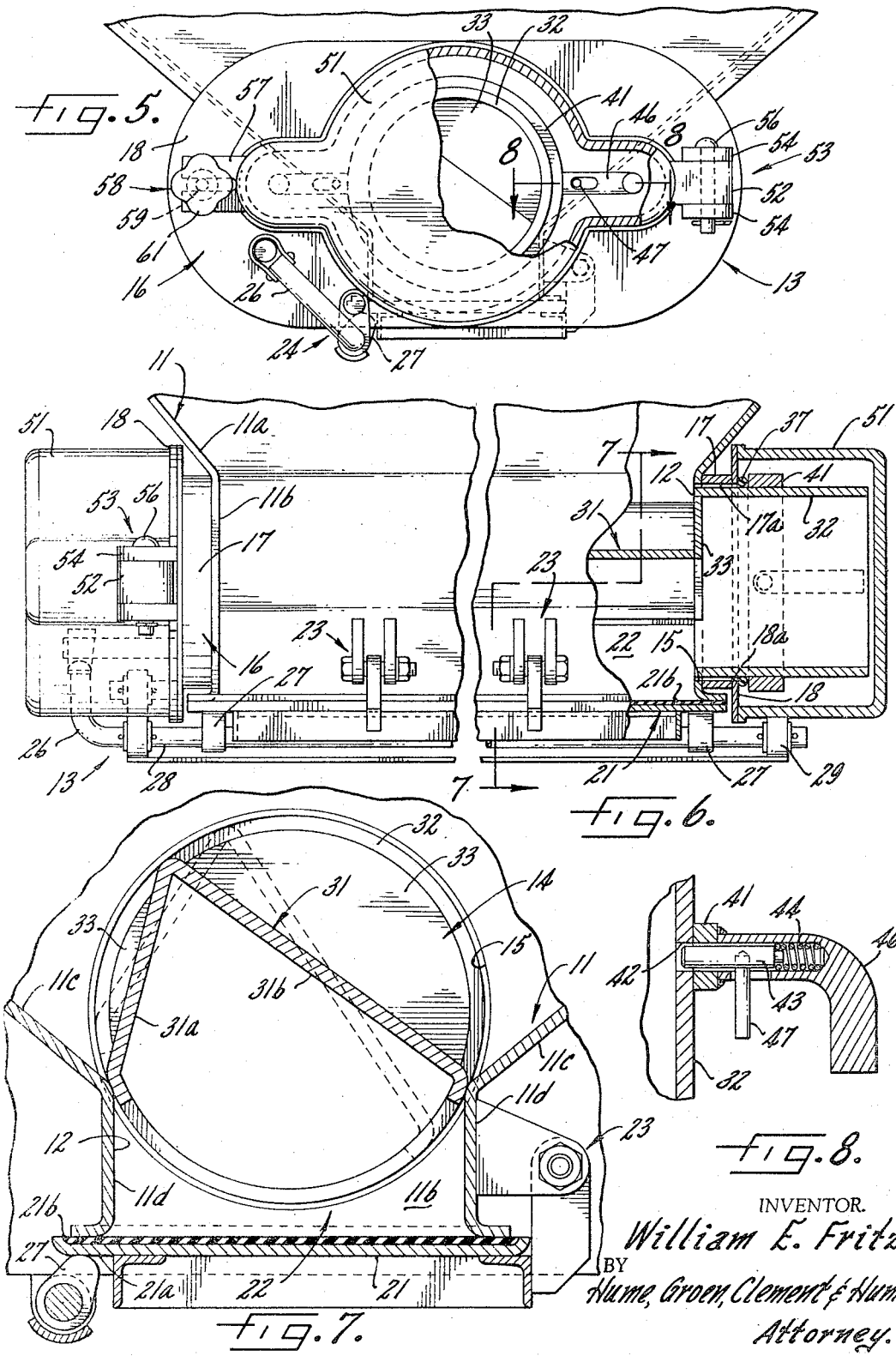

3,306,675
HOPPER CAR DISCHARGE APPARATUS
William E. Fritz, Hinsdale, Ill., assignor to Union Tank Car Company, Chicago, Ill., a corporation of New Jersey
Filed Mar. 26, 1964, Ser. No. 354,843
9 Claims. (Cl. 302—52)

This invention relates to railroad hopper cars and more particularly to apparatus for effecting the controlled discharge of finely divided granular materials from such cars.

It is an object of the present invention to provide improved apparatus for effecting the controlled discharge of granular materials from railroad hopper cars.

It is a further object of the present invention to provide a versatile apparatus for effecting the controlled discharge of granular materials from a railroad hopper car, which apparatus can be employed to effect either the controlled gravity discharge of such materials or the controlled discharge thereof through the use of conventional suction discharge means.

A further object of the present invention is to provide discharge apparatus for railroad hopper cars whereby the complete controlled unloading of a hopper car can be effected with a maximum unloading efficiency and without the need for repetitive unloading operations.

A further object of the present invention is to provide discharge apparatus as set forth above, which apparatus is readily disassemblable to facilitate cleaning, replacement, and repair functions normally incident to the use of such apparatus.

Other objects and advantages of the present invention will become apparent from the following description of one preferred embodiment thereof when considered in conjunction with the accompanying drawings wherein:

FIGURE 1 is a side elevational view of a typical railroad hopper car employing the material discharge controlling apparatus of the present invention;

FIGURE 2 is an end elevation of the railroad hopper car depicted in FIGURE 1;

FIGURE 3 is an enlarged perspective view of one preferred embodiment of the discharge controlling apparatus;

FIGURE 4 is a perspective view of a valve member employed in the apparatus illustrated in FIGURE 3;

FIGURE 5 is an enlarged fragmentary end view of a preferred embodiment of the discharge controlling apparatus with portions thereof broken away;

FIGURE 6 is a fragmentary rear elevational view of the discharge controlling apparatus;

FIGURE 7 is an enlarged fragmentary sectional view taken along the line 7—7 in FIGURE 6; and FIGURE 8 is an enlarged fragmentary cross sectional view taken along the line 8—8 in FIGURE 5.

Referring generally to the drawings, the present invention contemplates an improved apparatus for effecting the controlled discharge of finely divided granular materials from raliroad hopper cars. The apparatus preferably includes a suitable mounting structure that is secured to and/or forms a part of the converging walls of each hopper wherein granular material is typically stored. The mounting structure is located adjacent the hopper discharge port which, in a conventional manner, is defined by the converging hopper walls.

The mounting structure, which may employ a removable wall member that normally obstructs the hopper discharge port, is adapted to receive a valve member so that the valve member can be selectively rotated relative to the mounting structure and the discharge port defining walls of the hopper. In accordance with the present invention, the selective rotation of the valve member defines a controlled egress for granular material stored within the hopper. This valve member rotation, both independent of and in conjunction with the removal of the obstructing wall member, accommodates the unloading of the hopper car by means of conventional suction-type discharge apparatus or by gravity discharge. To facilitate maintaining the desired degree of cleanliness and to accommodate the normal replacement and repair operations that are incident to the utilization of such discharge apparatus, the valve member is readily removable from the support structure.

Referring more specifically to the drawings, FIGURES 1 and 2 generally illustrate a railroad hopper car 10 typical of that with which the discharge controlling apparatus of the present invention might be employed. The illustrated car 10 is provided with three hopper-type storage compartments 10a that are adapted to receive and confine a substantial supply of finely divided granular materials. Each of the hopper compartments 10a is defined by both vertical and converging hopper walls 11 that merge to form a discharge port 12 (FIG. 7) adjacent the underside of the car. The discharge ports 12, one of which is provided for each hopper 10a, extend transversely of the longitudinal axis of the car 10 and are located in spaced relation to each other along this axis.

Although the detailed structural features of the hopper car 10 do not form a part of the invention, it is preferable if the structural configuration of the joined (e.g. by welding or the like) discharge port defining walls 11 of the car 10 are generally similar to those depicted in FIGURE 3. This fragmentary view of one of the hoppers 10a illustrates the hopper defining walls 11 as including upper converging side wall segments 11a that terminate in generally vertical lower side wall segments 11b and front and rear upper converging wall segments 11c terminating in lower vertical wall segments 11d. The vertically disposed front, rear and side wall segments are joined together so that the discharge port 12 that is defined thereby has a generally rectangular configuration.

As outlined above, the discharge controlling apparatus includes a support structure 13, which is mounted in association with the discharge port defining wall segments 11b and 11d of each hopper 10a, and a valve member 14 that is mounted within the support structure for rotary movement relative thereto and to the discharge port 12. The specific structural features of these components are perhaps best illustrated in FIGURES 3-8.

In this connection, each of the vertical wall segments 11b of the hopper side walls have a circular aperture 15 formed therein, and a flanged mounting and support member 16, which forms a major portion of the support structure 13, is suitably secured to the outer surface of each of these aperture defining wall segments. More particularly, each such flanged mounting and support member 16 has a generally cylindrical base portion 17 that is secured to the corresponding aperture defining wall segment 11b by welding or the like so as to encompass and define a cylindrical mounting region 17a that is a continuation of the aperture 15. In addition, each flanged mounting and supporting member 16 includes a generally elongated, oval shaped supporting plate 18 that is formed integrally with the outer projecting edge of the base portion 17 and extends transversely of the central axis of the region 17a.

Each supporting plate 18 is provided with a central generally circular aperture 18a having a diameter that substantially corresponds to the internal diameter of the base portion 17 and to the diameter of the circular aperture 15 that is encompassed thereby. Accordingly, the oppositely disposed and apertured side wall segments 11b of each hopper 10a communicate with the members 16 so that a suitable mounting is provided for the valve member 14.

In addition to the valve member mounting structure 13, the discharge port defining wall segments 11b and 11d cooperate with a pivotally mounted lower enclosing wall member 21 to define a material receiving and mixing chamber 22, with which the discharge port 12 communicates and to which access can be had through the communicating aperture 18a, region 17a and aperture 15. When in a closed position, as shown in FIGS. 5–7, the lower wall member 21, which is provided with a suitable sealing gasket 21b, obstructs the discharge port 12 and provides a sealed closure for the chamber 22.

More particularly, the wall member 21 and the mounting and locking means therefor are preferably both structurally and functionally similar to the cover plate structure disclosed in the copending application of the common assignee, Serial No. 304,445 which was filed on August 26, 1963. That is, the wall member 21 is preferably pivotally secured to the outer surface of the rearward vertical wall segments 11d by means of a conventional dual hinge arrangement 23 as best seen in FIGS. 6 and 7. A locking means 24 including a pivotally mounted lever 26 and a pair of spaced apart cams 27 is utilized with the wall member 21 to effect a sealed closure of th chamber 22. In this connection and as is obvious from FIGURES 5–7, the pivotal movement of the lever 26 in a counterclockwise direction advances the spaced apart cams 27 out of engagement with the forward edge 21a of the wall member 21. This actuation of the locking means 24 allows the wall member to be pivoted downwardly and away from the chamber 22. As described in detail in the aforementioned copending application, the lever 26 is preferably secured to a cam supporting shaft 28 which is suitably mounted within bearing and support members 29 that are, in turn, mounted on and extend from the outer surfaces of each of the support plates 18 (FIG. 6).

Although a valve member 14 can be utilized with hopper car structures that do not employ a selectively pivotal wall member 21, any number of removable plates or wall members can and are preferably employed to provide a selectively removable sealed closure for the chamber 22. The illustrated pivotally mounted wall member 21, as disclosed and claimed in the aforementioned copending application, is preferable in that it is both readily actuable and provides an excellent sealed closure for the chamber 22. As hereinafter described in detail, the wall member 21 is pivoted to an open position when it is desired to unload granular material by means of gravity discharge and is closed when the discharge of the material is effected through the use of conventional suction discharge apparatus.

Whether gravity or suction-type unloading of granular material is effected, it is the valve member 14 and its orientation in respect of the support structure 13 that actually controls the discharge of granular material from the hoppers 10a. In view of this fact, the valve member 14 is constructed so that maximum unloading efficiency is realized, so that the discharge controlling apparatus can be readily and easily actuated, and so that the entire apparatus can be readily cleaned, replaced and/or repaired.

More particularly and as shown in FIG. 3, the valve member 14 is preferably comprised of a central, generally inverted V-shaped valve segment 31 that is defined by a pair of merged slanting deflection plates or wall members 31a and 31b, with the plate 31b being slightly longer than the plate 31a. This central valve segment is secured at its oppositely disposed ends to a pair of generally cylindrical mounting and discharge tubes 32. In this connection, the oppositely disposed terminal edges of the central V-shaped segment 31, which functions as the actual control valve for the discharge port 12, are preferably welded at circumferentially spaced locations to the inner edge of the mounting and discharge tubes 32.

The areas between the upper surfaces of the deflection plates 31a and 31b and the adjacent arcuate segments of the mounting and discharge tubes 32 are filled by end plates 33. These end plates 33 are preferably welded both to the inner arcuate surfaces of the discharge tubes 32 and to the adjacent edge portions of the plates 31a and 31b so that these regions are fully and permanently obstructed. On the other hand, the corresponding regions beneath the deflection plates are unobstructed so that access can be had to the chamber 22 through the discharge tubes 32.

In accordance with the invention, the length of the central valve segment 31 corresponds to the length of the discharge port 12, and the deflection plates are joined together at an angle such that the distance between the rounded edge portions thereof is slightly greater than the width of the discharge port (see FIG. 7). Accordingly with the valve member 14 in the normally closed position, the rounded edge portions thereof sealingly engage the junction of the wall segments 11c and 11d and the discharge port 12 is completely blocked.

The manner in which the valve member 14 is mounted within the supporting structure 13 for movement relative thereto is perhaps best illustrated in FIGURES 6 and 8. As shown, the generally cylindrical mounting and discharge tubes 32 are fitted within and extend through the mounting regions 17a defined by the support members 16 and through the apertures 15 and 18a that communicate therewith. The end of each discharge tube 32 extends substantially beyond the outer surface of the corresponding support plate 18 so that coupling means (not shown) of conventional suction discharge means can be readily secured thereto as is hereinafter more fully described.

The outer diameter of each of the discharge tubes 32 is selected so that each tube fits snugly within the mounting region defined by the corresponding support member 16 and is freely rotatable relative thereto. The positioning of the discharge tubes 32 within the support members 16 can be effected without using an additional bearing sleeve (as shown); however, if desired, a bearing sleeve can be employed so as to encompass that portion of the tubes 32 that is confined within the mounting regions 17a.

When the valve member 14 is properly positioned within the support structure 13 (i.e. with the inner edge of each discharge tube aligned with the inner surface of the vertical side wall segments 11b), an O-ring 37 is preferably fitted over the outer circumferential surface of each cylindrical discharge tube 32. The O-rings 37, as best seen in FIG. 6, are positioned in abutting relationship with the outer, aperture defining portions of the support plates 18 so that any air passage existing between the inner cylindrical surface of the support members 16 and the peripheral surface of the discharge tubes is effectively sealed.

The O-rings 37 are held in place against the corresponding support plates 18 by dual handled valve actuating collars 41, one of which is preferably removably secured to each discharge tube 32 so as to facilitate the controlled rotation of the corresponding valve member 14 in response to suitable force being exerted on the dual handles thereof. In this connection and as illustrated in FIGURE 8, each discharge tube 32 is provided with a pair of aligned but diametrically opposed apertures 42. The apertures 42 are designed to receive the projecting free ends of a pair of spring biased mounting pins 43 provided on each valve actuating collar 41.

That is, each collar 41 is fitted over a corresponding discharge tube 32 and is advanced into engagement with the sealing O-ring 37. This positioning of the collar 41 is effected with the mounting pins 43 in a withdrawn position; however, after the collar has been properly located on the discharge tube, the mounting pins pass into the apertures 42 to secure the collar thereto (FIGS. 5 and 8). Preferably, each of the mounting pins 43 and an associated biasing spring 44 are confined within a recessed portion of each of the dual handles 46. A pin actuating element 47, which is suitably secured to each pin member 42 and which extends from the recessed portion of the handle wherein the pin member is mounted, is utilized in a conventional manner to effect the desired actuation of the pin members against the action of the springs 44 so that the mounting and/or removal of the dual handled collars 41 can be readily effected.

As previously outlined, the discharge tubes 32 of each valve member 14 are designed and proportioned to receive coupling elements (not shown) of the type typically employed with conventional suction discharge means. Therefore and to facilitate the suction discharge of granular material from the hoppers 10a, it is necessary that the discharge tubes 32 be readily accessible. However, it is equally important to enclose and seal the discharge tubes 32 at other times (e.g. during transport of the granular material). To this end, each support plate 18 of the flanged mounting and support members 16 serves as the mounting for a suitable cap 51 as depicted in FIGURES 3, 4 and 5.

Each cap 51, which both seals the end of the discharge tube 32 with which it is associated and precludes the accidental actuation of the valve member 14, has an irregular configuration that complements and is designed to encompass the discharge tube 32 as well as the associated valve actuating collar 41. An apertured mounting element 52 projects from one end of the cap 51 and is secured to a conventional hinge-like arrangement 53 including a pair of spaced apart and suitably apertured brackets 54 that are mounted on and extend from the support plate 18. That is, a removable mounting pin 56 extends through and is confined within the aligned apertured portions of the brackets 54 and mounting element 52 so that the cap is secured to the plate 18 for pivotal movement relative thereto.

The oppositely disposed edge of each cap 51 is provided with a bifurcated latching element 57 that is designed to cooperate with a locking device 58 that is also secured to and extends from the support plate 18. In this connection, the locking device 58 includes a pivotally mounted pin member 59 having an outer threaded end portion and a locking nut 61 that is threadably mounted on the pin 59. As is obvious from this configuration, the pin 59 is designed to mate with the bifurcated latching element 57 when the cap is in a closed position. Thereafter, the locking nut 61 is selectively threaded into abutting relation with the latching element 57 and bears against the latching element 57 to lock the cap 51 in a closed position. When it is desired to allow access to the discharge tubes 32 of the valve members 14, the locking nut 61 is threadably withdrawn and the cap 51 is pivoted relative to the hinge-like arrangement 53.

Considering in detail the overall operation of the discharge apparatus of the present invention, it will be appreciated that the apparatus is capable of accommodating either the controlled suction or gravity discharge of granular material from the hoppers 10a. In this connection, if the removal of granular material is to be effected from a hopper 10a through the use of conventional suction discharge means (not shown), a suitable coupling element associated with the suction creating and material receiving apparatus to the discharge means is suitably connected to the discharge tube 32 on the most convenient side of the car. This connecting operation is of course effected after the caps 31 associated with this hopper have been opened to allow access to both discharge tubes 32 on the oppositely disposed sides of the valve member 14.

With one discharge tube 32 connected to the suction means and with the other tube of the valve member exposed to the surrounding environment, the creation of a suction force causes air to be drawn through the mixing chamber 22 with which the discharge tubes communicate as previously described. After the desired air circulation rate is established in the mixing chamber 22, the dual handles 46 of one of the collar members 41 are grasped and turned so as to effect the rotation of the valve member 14 relative to the supporft structure 13 (i.e. the discharge tubes 32 of the supported valve member 14 freely rotate within the support members 16).

In response to this rotation, the central V-shaped valve segment 31 is advanced from the normal discharge port obstructing position to a suitable position such as shown in dotted outline in FIGURE 7. When in this position, relative to the discharge port 12, the deflection plates 31a and 31b and the discharge port defining wall segments 11b and 11d define substantially equal discharge passages so that the granular material flows at a controlled rate into the mixing chamber 22, wherein it is blended with the air being circulated through the chamber and wherefrom it is conveyed to suitable receiving apparatus (not shown) of the type typically employed with the suction discharge means.

Although various characteristics of the granular material (e.g. particle size, moisture content, etc.) dictate the magnitude of the suction force and the position of the valve member which yield an optimum material discharge flow rate, it has been found that a suitable angle of rotation of the valve member 29 is approximately 23°. This angular displacement of the valve member 14 leads to the realization of substantially equal discharge paths between the rounded edge portions of the deflection plates 31a and 31b and the discharge port defining wall members 11b and 11d.

When external suction discharge means are not available and/or when it is desired to effect the gravity discharge of granular material from the hoppers 10a, the valve member 14 and the lower chamber sealing wall member 21 of the hoppers are concomitantly actuated. That is, the lever 26 is pivotally advanced in a counter-clockwise direction to move the cam members 27 out of engagement with the forward edge 21a of the wall member 21. After this has been effected and the wall member 21 has been pivoted downwardly and away from the chamber 22, a suitable boot or guide means (not shown) can be attached to the resulting rectangular opening so that the granular material discharge from the hopper can be guided to a receiving pit or the like located below track level. Thereafter, the valve member 14 is suitably rotated as previously described to yield the desired gravity discharge flow rate.

Irrespective of the manner in which the granular material is discharged from the hoppers 10a, the discharge apparatus of the present invention leads to the realization of accurately controllable and efficient discharge operations that can be effected in a minimum amount of time. In this connection, the inverted V-shaped configuration of the valve segment 14 and configurations corresponding essentially thereto provide substantially equal discharge paths when in an operated position so that a substantially uniform discharge rate can be achieved. Since the deflection plates 31a and 31b are joined along a relatively narrow edge, essentially no residue of material remains in the hoppers after a discharge operation and the need for repetitive unloading operations is eliminated. Moreover, the inverted V-shaped valve segment formed by the plates of different length acts somewhat like a butterfly valve so that the pressure of material on the legs of the V does not restrict movement to the open position. This is because the long leg of the V pivots away from the load when the valve is rotated in the clockwise direction as viewed in FIG. 7. If the V were symmetrical (i.e. equal legged) one leg would have to lift against material when the valve was pivoted to an open position. In this latter regard, both closing edges of the V draw away from hopper walls when the valve is pivoted to an open position so that no pellets can be impinged between the valve and chamber walls to cause binding of the valve. Additionally, the inverted V shape allows a large gravity discharge opening with the V rotated approxiamately 45°–50° in a clockwise direction as viewed in FIGURE 7 and clockwise to a position where the long leg 31b is approximately vertical.

In addition to facilitating efficient and reliably controllable discharge operations, the discharge apparatus of the present invention is constructed so that the valve members 14 can be readily removed for periodic cleaning, replacement and/or repair operations that are normally incident to the use of such apparatus. As is obvious from the foregoing description, such removal is readily effected by merely removing the dual handled collar 41 from one of the discharge tubes 32 and withdrawing the valve member from the support structure on the opposite side of the hopper.

It should be understood that the foregoing description is merely illustrative of one preferred embodiment of the invention. In this regard, it will be appreciated that various details of the hopper car and discharge apparatus construtcion which would be obvious to one skilled in the art have not been specifically dealt with. For example, it will be appreciated that the various components of the structure which contact the granular material should be fabricated of stainless steel or other materials which meet the necessary requirements and standards of the industry. It will be further appreciated that various modifications of the structure as described might be devised by one skilled in the art without departing from the invention, various features of which are set forth in the accompanying claims.

What is claimed is:

1. Apparatus for effecting the controlled discharge of granular material from a hopper-type storage compartment of a railroad hopper car and thorugh a hopper discharge port that is defined by the walls of the hopper adjacent a lower extremity thereof; which apparatus comprises a support structure secured to the discharge port defining walls of the hopper; and a generally V-shaped valve member mounted within said support structure for selective rotary movement into and out of obstructing relationship with said discharge port; said generally V-shaped valve member being in an inverted position with the apex thereof extending into the hopper when said valve member is in obstructing relationship relative to said discharge port; said valve member, said support structure and the discharge port defining walls of the hopper forming a mixing chamber whereto material is discharged in response to the rotary movement of said valve member out of obstructing relationship with said discharge port.

2. Apparatus in accordance with claim 1 wherein said valve member and said support structure define conduit means that communicates with said mixing chamber so that an air circulation path can be established therethrough and whereby the suction discharge of material passing into said chamber can be effected.

3. In a railroad hopper car including at least one hopper type storage compartment that communicates with at least one hopper discharge port that is defined by the walls of the hopper adjacent a lower extremity thereof, apparatus for effecting the controlled discharge of granular materials from the hopper car; which apparatus comprises a support structure secured to the discharge port defining walls of the hopper; a generally V-shaped valve member removably mounted within said support structure for rotary movement relative thereto and for movement into and out of obstructing relationship to said discharge port; said generally V-shaped valve member being in an inverted position with the apex thereof extending into the hopper when said valve member is in obstructing relationship relative to said discharge port; means secured to said discharge port defining walls of the hopper so as to be selectively positionable with respect thereto, said last mentioned means having a normal position in engagement with the hopper and in spaced relation to said valve member so that a mixing chamber is defined by said valve member, said discharge port defining walls and said selectively positionable means when in a normal position, said selectively positionable means having an alternate position that allows material passing through said port and into said chamber to be discharged from the hopper car.

4. Apparatus for effecting the controlled discharge of granular materials from a hopper-type storage compartment of a railroad hopper car and through a generally rectangular hopper discharge port that is defined by suitably apertured wall segments of the hopper adjacent a lower extremity thereof; which apparatus comprises a support structure; said support structure including generally tubular mounting members adapted to be secured to the apertured discharge port defining wall segments on oppositely disposed sides of the discharge port and being apertured so as to communicate with the apertured portions of the wall segments; a valve member mounted within said support structure for selective angular displacement relative thereto and into and out of obstructing relationship with said discharge port; said valve member having a central generally V-shaped valve segment proportioned to fit within said discharge port so as to effect the complete obstruction thereof when in a normal position; said central generally V-shaped valve segment being in an inverted position with the apex thereof extending into the hopper when said valve segment is in obstructing relationship relative to said discharge port; said valve member also having oppositely disposed tubular ends joined to said valve segment; said tubular ends of said valve member being positioned within and extending through said apertured portions of said mounting members and said discharge port defining wall segment; and means removably secured to at least one of said tubular ends of said valve member for maintaining said valve member within said support structure and for facilitating the selective angular displacement thereof from said normal position to an alternate position whereat controlled material discharge openings are defined between said valve segment and the discharge port defining wall segments.

5. Apparatus for effecting the controlled discharge of granular materials from a hopper-type storage compartment of a railroad hopper car and through a generally rectangular hopper discharge port that is defined by suitably aperture wall segments of the hopper adjacent a lower extremity thereof; which apparatus comprises a support structure; said support structure including generally tubular mounting members adapted to be secured to the apertured hopper discharge port defining wall segments on oppositely disposed sides of the discharge port and being apertured so as to communicate with the apertured portions of the wall segments; a valve member mounted within said support structure for selective angular displacement relative thereto and into and out of obstructing relationship with said discharge port; said valve member having a central generally V-shaped valve segment proportioned to fit within said discharge port so as to effect the complete obstruction thereof when in a normal position; said central generally V-shaped valve segment being in an inverted position with the apex thereof extending into the hopper when said valve segment is in obstructing relationship relative to said discharge port; said valve member also having oppositely disposed tubular ends joined to said valve segment; said tubular ends of said valve member being positioned within and extending through said apertured portions of said mounting members and said discharge port defining wall segments; means removably secured to at least one of said tubular ends of said valve member for maintaining said valve member within said support structure and for facilitating the selective angular displacement thereof from said normal position to an alternate position whereat controlled material discharge openings are defined between said valve segment and the discharge port defining wall segments; and a selectively positionable wall member secured to said support structure and adapted to be mounted on the discharge port defining wall segments; said selectively positionable means having a normal position in sealing engagement with the hopper discharge port defining wall segments and in spaced relation to said central valve segment so that a mixing chamber is defined by said central valve segment, said selectively positionable means and the discharge port defining wall segments; said selectively positionable means having an alternate position that allows material passing through said controlled material discharge openings and into said chamber to be discharged from the hopper-type storage compartment.

6. Apparatus for effecting the controlled discharge of granular materials from a hopper-type storage compartment of a railroad hopper car and through a generally rectangular hopper discharge port that is defined by suitably apertured wall segments of the hopper adjacent a lower extremity thereof; which apparatus comprises a support structure; said support structure including generally tubular mounting members adapted to be secured to the apertured hopper discharge port defining wall segments on oppositely disposed sides of the discharge port and being apertured so as to communicate with the apertured portions of the wall segments; a valve member mounted within said support structure for selective angular displacement relative thereto and into and out of obstructing relationship with said discharge port, said valve member having a central generally V-shaped valve segment proportioned to fit within said discharge port so as to effect the complete obstruction thereof when in a normal position; said central generally V-shaped valve segment being in an inverted position with the apex thereof extending into the hopper when said valve segment is in obstructing relationship relative to said discharge port; said valve member also having oppositely disposed tubular ends joined to said valve segment; said tubular ends of said valve member being positioned within and extending through said apertured portions of said mounting members and said discharge port defining wall segments; means movably secured to at least one of said tubular ends of said valve member for maintaining said valve member within said support structure and for facilitating the selective angular displacement thereof from said normal position to an alternate position whereat controlled material discharge openings are defined between said valve segment and the discharge port defining wall segments; and a selectively positionable wall member secured to said support structure and adapted to be mounted on the discharge port defining wall segments; said selectively positionable means having a normal position in sealing engagement with the hopper discharge port defining wall segments and in spaced relation to said central valve segment so that a mixing chamber is defined by said central valve segment, said selectively positionable means and the discharge port defining wall segments; said tubular ends of said valve member defining conduit means communicating with said defined mixing chamber so that an air circulation path can be established therethrough and whereby the suction discharge of material passing through said controlled discharge openings and into said mixing chamber can be effected with said selectively positionable means in said normal position; said selectively positionable means having an alternate position that allows material passing through said controlled material discharge openings and into said chamber to be discharged from the hopper-type storage compartment.

7. In a railroad hopper car including a plurality of hopper-type storage compartments each of which communicates with at least one generally rectangular hopper discharge port that is defined by suitably apertured wall segments of each hopper adjacent a lower extremity thereof, apparatus for selectively effecting the controlled discharge of granular material from each of the storage compartments; which apparatus comprises a support structure for each storage compartment; said support structure including a pair of generally tubular mounting members adapted to be secured to the hopper discharge port defining wall segments of each hopper compartment on oppositely disposed sides of the discharge port and being apertured so as to communicate with the apertured portions of the wall segments; a valve member mounted within each of said support structures for selective angular displacement into and out of obstructing relationship with said discharge port; said valve member having a central generally V-shaped valve segment proportioned to fit within said discharge port so as to effect the complete obstruction thereof when in a normal position; said central generally V-shaped valve segment being in an inverted position with the apex thereof extending into the hopper when said valve segment is in obstructing relationship relative to said discharge port; said valve member also having oppositely disposed tubular ends joined to said valve segment; said tubular ends of each of said valve members being positioned within and extending through said apertured portions of said mounting members and said discharge port defining wall segments; and means removably secured to at least one of said tubular ends of each valve member for maintaining said valve member within said support structure and for facilitating the selective angular displacement thereof from said normal position to an alternate position whereat controlled material discharge openings are defined between said valve segment and the discharge port defining wall segments of each compartment.

8. Apparatus for effecting the controlled discharge of granular material from a hopper-type storage compartment of a railroad hopper car and through a hopper discharge port that is defined by the walls of the hopper adjacent a lower extremity thereof; which apparatus comprises a support structure secured to the discharge port defining walls of the hopper; a generally V-shaped valve member mounted within said support structure for rotary movement relative thereto and for selective movement into and out of obstructing relationship with said discharge port; said generally V-shaped valve member being in an inverted position with the apex thereof extending into the hopper when said valve member is in obstructing relationship relative to said discharge port; and means adapted to be secured to said discharge port defining walls of the hopper so as to be selectively positionable relative thereto; said selectively positionable means having a normal position in engagement with the discharge port defining walls of the hopper and in spaced relation to said valve member so that a mixing chamber is defined by said valve member, said selectively positionable means and the hopper discharge port defining walls; said selectively positionable means having an alternate position that allows material passing through said discharge port and into said chamber to be discharged from the hopper-type storage compartment.

9. Apparatus in accordance with claim 8 wherein said valve member and said support structure define conduit means that communicates with said defined mixing chamber so that an air circulation path can be established therethrough and whereby the suction discharge of material passing through said port and into said chamber can be effected with said selectively positionable means in said normal position.

References Cited by the Examiner

UNITED STATES PATENTS

| | | | |
|---|---|---|---|
| 2,647,802 | 8/1953 | Hornbrook | 302—52 |
| 2,919,158 | 12/1959 | Aller | 302—52 |
| 2,962,325 | 11/1960 | Dorey | 302—52 |
| 3,182,954 | 5/1965 | Borger | 302—52 |
| 3,194,420 | 7/1965 | Kemp et al. | 302—52 |

ANDRES H. NIELSEN, *Primary Examiner.*